United States Patent
Lin (10) Patent No.: US 7,444,006 B2
(45) Date of Patent: Oct. 28, 2008

(54) METHOD OF IMAGE QUALIFICATION FOR OPTICAL NAVIGATION SENSOR

(75) Inventor: Chun-Huang Lin, Hsinchu (TW)

(73) Assignee: Pixart Imaging Inc., Hsin-Chu (TW)

( * ) Notice: Subject to any disclaimer, the term of this patent is extended or adjusted under 35 U.S.C. 154(b) by 772 days.

(21) Appl. No.: 10/942,202

(22) Filed: Sep. 16, 2004

(65) Prior Publication Data
US 2005/0031170 A1    Feb. 10, 2005

Related U.S. Application Data

(63) Continuation-in-part of application No. 10/286,113, filed on Nov. 1, 2002, now Pat. No. 7,142,695.

(30) Foreign Application Priority Data
Apr. 16, 2002 (TW) ............... 91107727 A (51) Int. Cl.
*G06K 9/00* (2006.01)
(52) U.S. Cl. ............ 382/107; 356/28; 348/155; 345/158

(58) Field of Classification Search ............ 382/100, 382/103, 107; 348/154, 155, 226.1, 447; 345/158, 39, 82; 356/27, 28, 28.5; 73/488
See application file for complete search history.

(56) References Cited

U.S. PATENT DOCUMENTS

| | | | | |
|---|---|---|---|---|
| 5,087,916 A * | 2/1992 | Metzdorff et al. | ............ | 342/64 |
| 5,557,684 A * | 9/1996 | Wang et al. | ............ | 382/107 |
| 5,751,831 A * | 5/1998 | Ono | ............ | 382/103 |
| 6,115,482 A * | 9/2000 | Sears et al. | ............ | 382/114 |
| 6,532,208 B2 * | 3/2003 | Nakajima | ............ | 369/275.4 |
| 7,176,442 B2 * | 2/2007 | Feldmeier et al. | ............ | 250/221 |

* cited by examiner

*Primary Examiner*—Anand Bhatnagar
(74) *Attorney, Agent, or Firm*—Tung & Associates (57) ABSTRACT

An image qualification method. A motion detection method. An optical navigation sensor. Image qualification, requiring only a single image frame to determine if an image frame is qualified, proceeds in real time. On the basis of the image qualification method, a motion detection method that prevents erroneous flickers is also provided for use in an optical navigation sensor.

22 Claims, 7 Drawing Sheets

METHOD OF IMAGE QUALIFICATION FOR OPTICAL NAVIGATION SENSOR

CROSS REFERENCE

This application is a continuation in part of Application U.S. Ser. No. 10/286,113 filed on Nov. 1, 2002 now U.S. Pat. No. 7,142,695.

BACKGROUND

The present invention relates to an image qualification method, and more especially to motion detection methods for an optical navigation sensor.

An optical navigation sensor detects motion by comparing image correlations captured at different times. Thus, quality of image can affect motion detection by the optical navigation sensor, and is affected by noise, blurring out of focus, illumination, and other facts. A LED in the optical navigation sensor prevents erroneous detection resulting from variations in illumination. When the optical navigation sensor is exposed to illumination from a fluorescent light driven by 60 Hz or 50 Hz AC power, however, periodical variations result in flicker and subsequent errors in motion detection.

A disadvantage of conventional image qualification is that several image frames are needed to calculate correlations there between to determine whether the optical navigation is in focus. Thus, several buffers are required and time delay is unavoidable.

SUMMARY

An embodiment of the invention provides a motion detection method for an optical navigation sensor. The motion detection method comprises the following steps. First, an image frame associated with the optical navigation sensor is captured. According to the image frame and a quality prerequisite, a qualified image frame is then distinguished from an unqualified image frame. Thereafter, a first counter is provided to record incidence of qualified image frames, and a second counter is provided to record incidence of unqualified image frames. When a first condition is met according to the image frame, the first counter and the second counter, motion detection and another capturing step proceed.

The embodiment of the invention also provides a real-time image qualification method for an optical navigation sensor, comprising the following steps. First, an image frame associated with the optical navigation sensor is captured, and a plurality of characteristics of the image frame is evaluated to determine whether the image frame is qualified or unqualified. Thereafter, a result is output accordingly for motion detection.

The embodiment of the invention also provides an optical navigation sensor comprising an image capture device, a quality control device and a motion detector. The image capture device captures an image frame, and the quality control device assesses the quality of the image frame and outputs a result indicating whether the image frame is qualified or unqualified for motion detection. The motion detector is implemented according thereto.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION

The present invention discloses an image qualification method requiring only a single image frame to determine whether the frame is qualified for motion detection, and on the basis of the image qualification method, a motion detection method that prevents erroneous flickers is also provided for use in an optical navigation sensor.

Figure 1A:
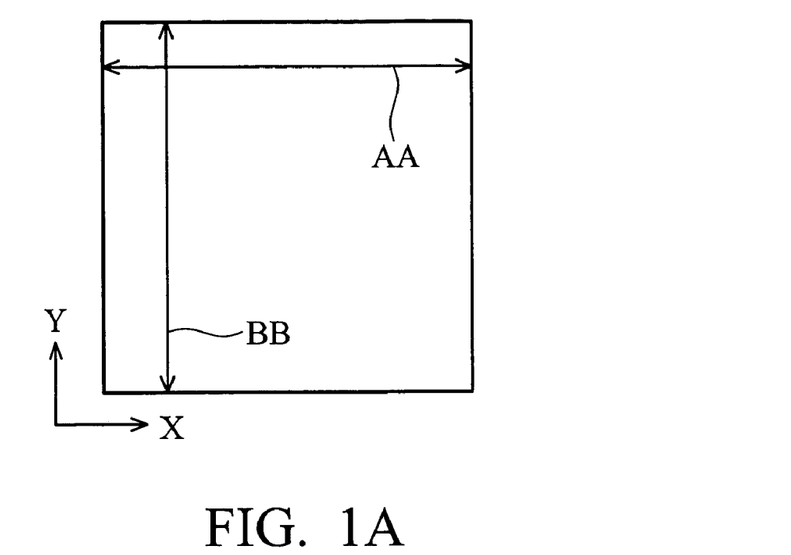
FIG. 1A illustrates two areas of image sensor arrays.

FIG. 1A illustrates two areas of image sensor array. To determine the quality of a frame, one area of the image sensors array BB of one area along axis Y is analyzed, and then all image sensor arrays along axis Y are analyzed in the same way.

Figure 1B:
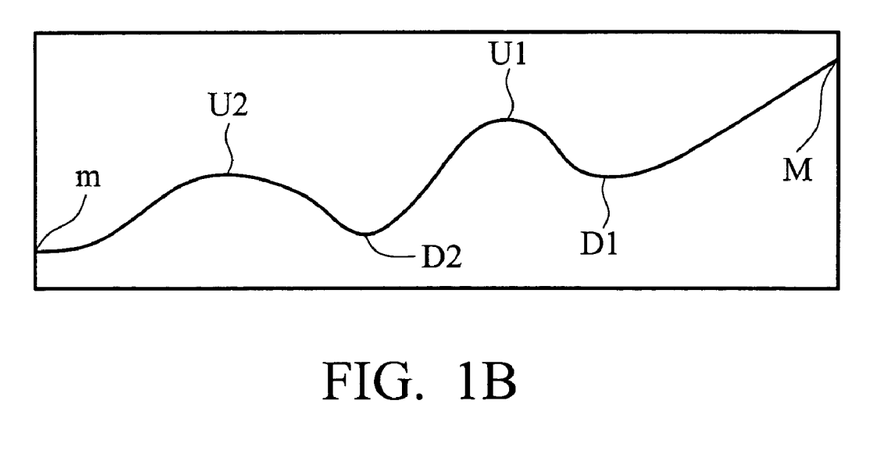
FIG. 1B shows up peaks and down peaks assessed according to FIG. 1A.

FIG. 1B illustrates images captured by an image sensor array in one area. The image sensor array in FIG. 1B can be along axis X or axis Y in FIG. 1A. FIG. 1B shows variations in brightness of the image pixels in one area, i.e. there are local maximums and minimums in brightness.

The quality of images in one area is determined by the extremes of brightness, up peaks and down peaks.

A pixel in one area of a frame with pixels on two sides is read as an up peak, such as U1, U2 shown in FIG. 1B. Conversely, a pixel in one area of a frame in which pixels on two sides is read as a down peak, such as D1, D2 shown in FIG. 1B. A pixel at an edge of one area of the frame, such as M or m in FIG. 1B, is not counted. A trivial method may be used to count the number of peaks. For example, brightness of pixels can be regarded as a data sequence, in which differentials between each successive element are compared to detect peaks. When the differential changes from decreasing to increasing, a down peak is found. Conversely, when the differential changes from increasing to decreasing, an up peak is found.

When the total number of peaks exceeds a critical number, the image in one area is deemed qualified. For example, in FIG. 1A, the number of peaks in two areas (AA and BB) of an image frame are scanned and calculated by an optical navigation sensor. The quality requirements vary from the need of applications. In one case, when at least one column (BB) or one row (AA) has number of peaks more than a predetermined value (i.e. 3), the image frame can be defined as qualified. Also, mean value of number of up peaks and down peaks cooperated with an upper threshold and a lower threshold, may be regarded as a quality requirement for the image qualification determination. Conversely, image frames not meeting the requirements are determined as unqualified.

A qualified image frame is used for motion detection and evaluation of correlation to detect motion. An unqualified image frame is excluded in determining motion.

In another case, a qualified image frame is used to detect motion, and qualified image frames detected thereby are output. Motion detected in the unqualified image frame is not output.

In another case, as described above, the qualified image frame is used for motion detection, and motion detected thereby is output. Unqualified image frames predicted motion according to previous motion is also determined and output. When the optical navigation sensor is in a flicker region, motion errors may result. The motion detection method disclosed in the present invention is based on the image qualification method.

Figure 2A:
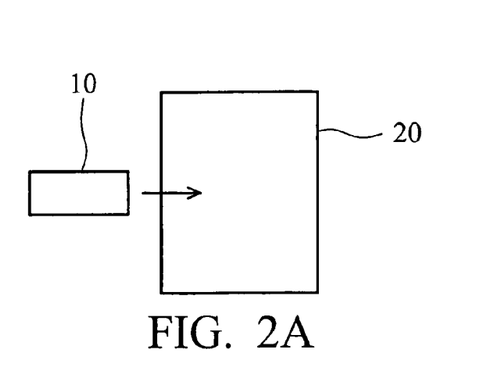
FIGS. 2A to 2E shows a flicker region by which the optical navigation sensor is affected.

FIG. 2A illustrates a flicker region by which the optical navigation sensor is affected.

At time t1, an optical navigation sensor 10 is outside a flicker region 20, such as a region illuminated by fluorescent light. An image frame captured by the optical navigation sensor 10 has NR1 rows of pixels, each of which has a number of peaks exceeding a critical number NPX thereof. NR1 of the rows exceed NRX. Thus, the quality of the image frame meets requirements. A second number of image frames meeting requirements are counted such that the second number exceeds a second maximum Nmax2. Then, the first number of image frames not meeting requirements is reset, and this image can be used for motion detection.

Figure 2B:
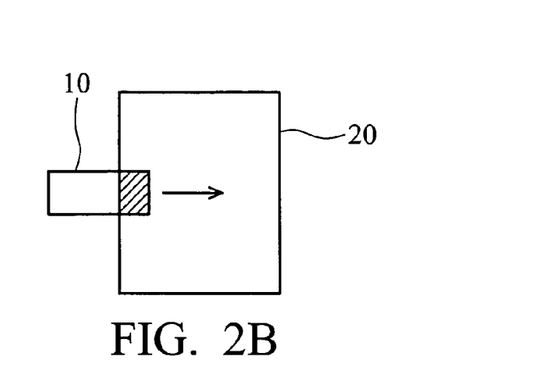

FIG. 2B illustrates a flicker region by which the optical navigation sensor is affected. At time t2, the optical navigation sensor 10 partially enters the flicker region 20. An image frame captured by the optical navigation sensor 10 has NR2 rows of pixels, of which each has a number of peaks exceeding a critical number NPX of the peaks. NR2 of the rows are less than a number NRX. Thus, the quality of the image frame does not meet requirements. The first number of image frames not meeting requirements is counted such that the first number does not exceed a first maximum Nmax1. Then, motion is determined by the image frame.

Figure 2C:
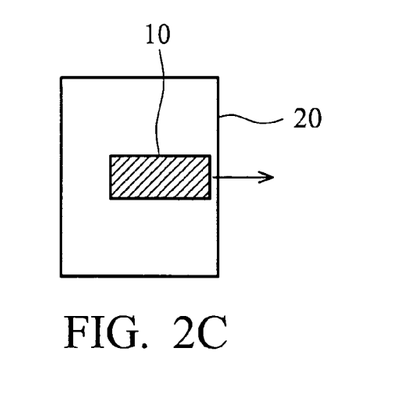

FIG. 2C illustrates a flicker region by which the optical navigation sensor is affected. At time t3, an optical navigation sensor 10 has fully entered the flicker region 20. An image frame captured by the optical navigation sensor 10 has NR3 rows of pixels, each with a number of peaks exceeding a critical number NPX. NR3 of the rows are less than a number NRX. Thus, the quality of the image frame does not meet requirements. The first number of image frames not meeting requirements is counted such that the first number exceeds the first maximum Nmax1. Then, the first number and the second number are both reset. The image frame is skipped and a new image frame is captured.

Figure 2D:
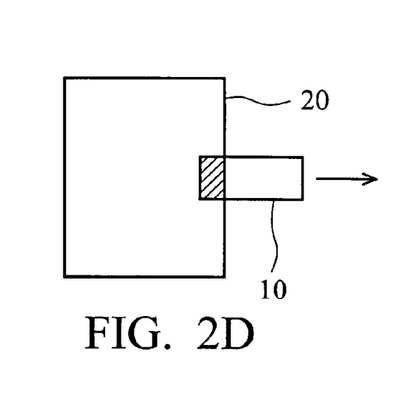

FIG. 2D illustrates a flicker region by which the optical navigation sensor is affected. At time t4, an optical navigation sensor 10 has partially left the flicker region 20. An image frame captured by the optical navigation sensor 10 has NR4 rows of pixels, each of which has a number of peaks exceeding a critical number NPX. NR4 of the rows exceed NRX. Thus, the quality of the image frame meets requirements. The second number of image frames meeting requirements is calculated such that the second number does not exceed the second maximum Nmax2. The image frame is then skipped, and a new image frame is captured.

Figure 2E:
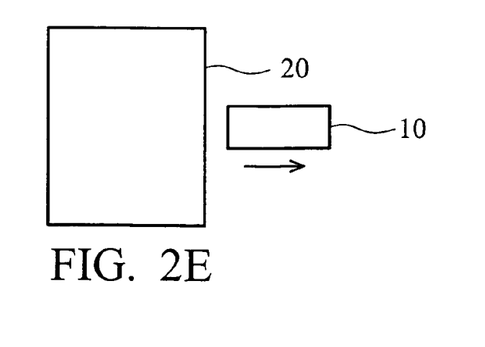

FIG. 2E illustrates a flicker region by which the optical navigation sensor is affected. At time t5, an optical navigation sensor 10 has fully left the flicker region 20. An image frame captured by the optical navigation sensor 10 has NR5 rows of pixels, each of which has a number of peaks exceeding a critical number NPX of the peaks. NR5 of the rows exceed NRX. Thus, the quality of the image frame meets requirements. The second number of image frames meeting requirements is counted such that the second number exceeds the second maximum Nmax2. The first number is then reset, and motion is detected by the image frame.

Figure 3:
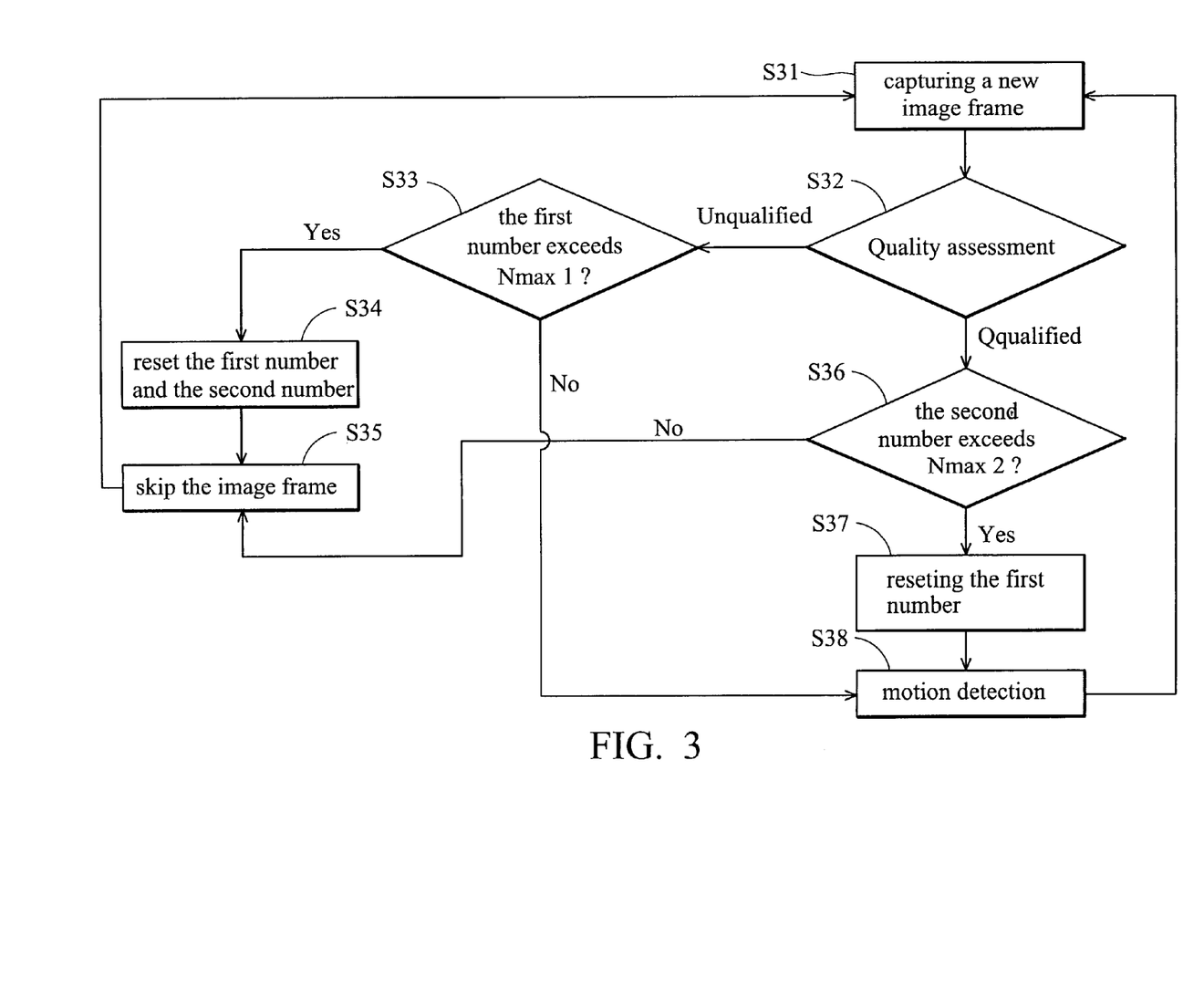
FIG. 3 is a flowchart of the motion detection method.

FIG. 3 is a flowchart of the motion detection method.

In step S31, an image frame is captured to assess the quality of the image.

In step S32, if the quality of the image frame meets requirements, the image frame is a qualified image frame, and the process proceeds to step S36. If not, the process proceeds to step S33.

In step S33, a first number of image frames not meeting requirements are calculated. When the first number of image frames not meeting requirements exceeds a first maximum Nmax1, the process proceeds to step S34. Otherwise, the process proceeds to step S38.

In step S34, a first counter counting the first number of image frames not meeting requirements is reset. A second counter counting the second number of image frames meeting requirements is reset.

In step S35, the image frame is skipped, and motion is not output. The process returns to step S31.

In step S36, the quality of the image frame meets requirements, and the second counter counts the second number of image frames meeting requirements. If the second number of qualified image frames exceeds a second maximum Nmax2, the process proceeds to step 37, otherwise the process returns to step S35.

In step S37, the first counter is reset.

In step S38, motion of the optical navigation sensor is estimated by the image frame, or a predictive process, thus the erroneous flickers can be prevented thereby.

Figure 4:
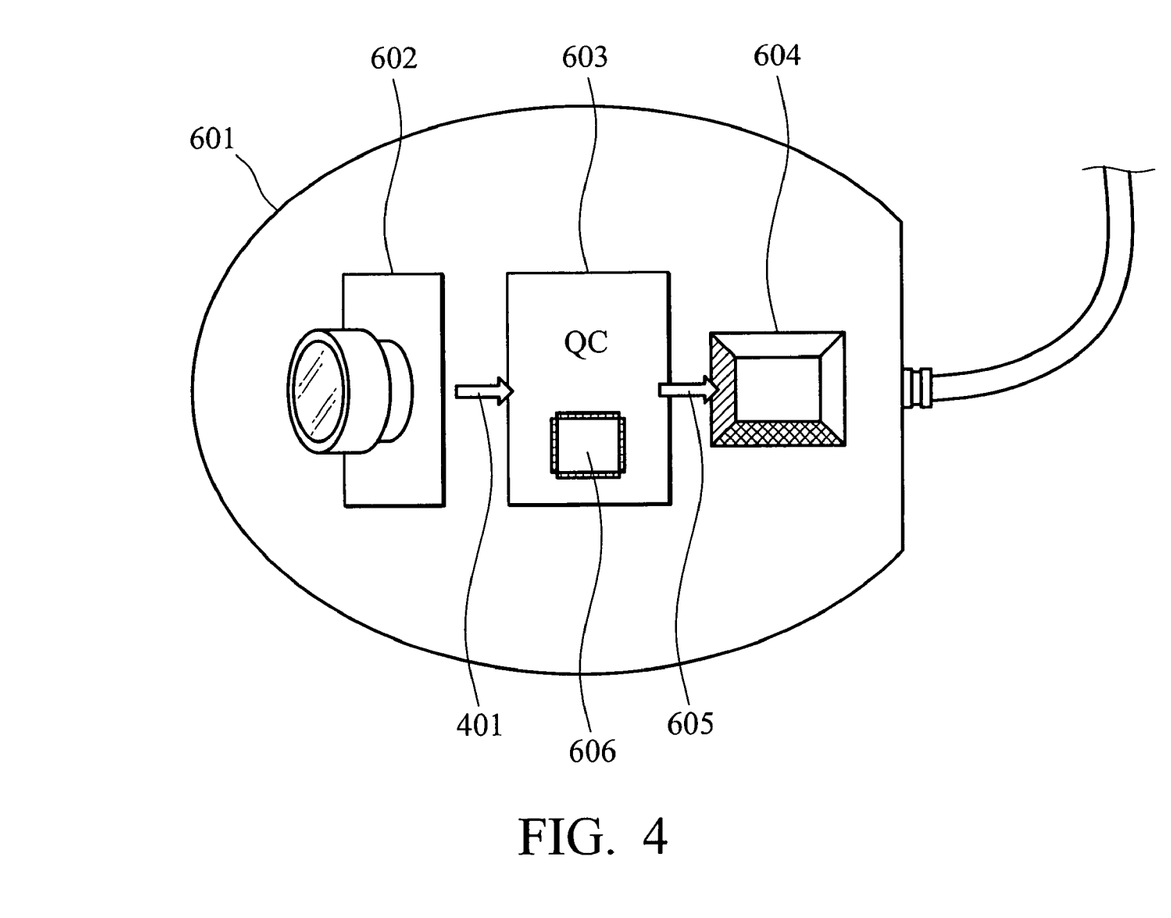
FIG. 4 is a block diagram of an optical navigation sensor.

FIG. 4 is a block diagram of an optical navigation sensor 601. An optical navigation sensor 601 is generally used for motion detection. To detect motion, image frames are captured periodically, and sent to the quality control device 603 for quality assessment and elimination of effects such as flicker caused by fluorescent light. After distinguishing a qualified image frame from an unqualified image frame according to a quality prerequisite, a result 605 indicating whether the image frame is qualified or unqualified is then sent to the motion detector 604. Control of the sensitivity and quality prerequisites of the quality control device 603 is provided by a threshold control device 606 by tuned values of a qualified threshold and an unqualified threshold.

Figure 5A:
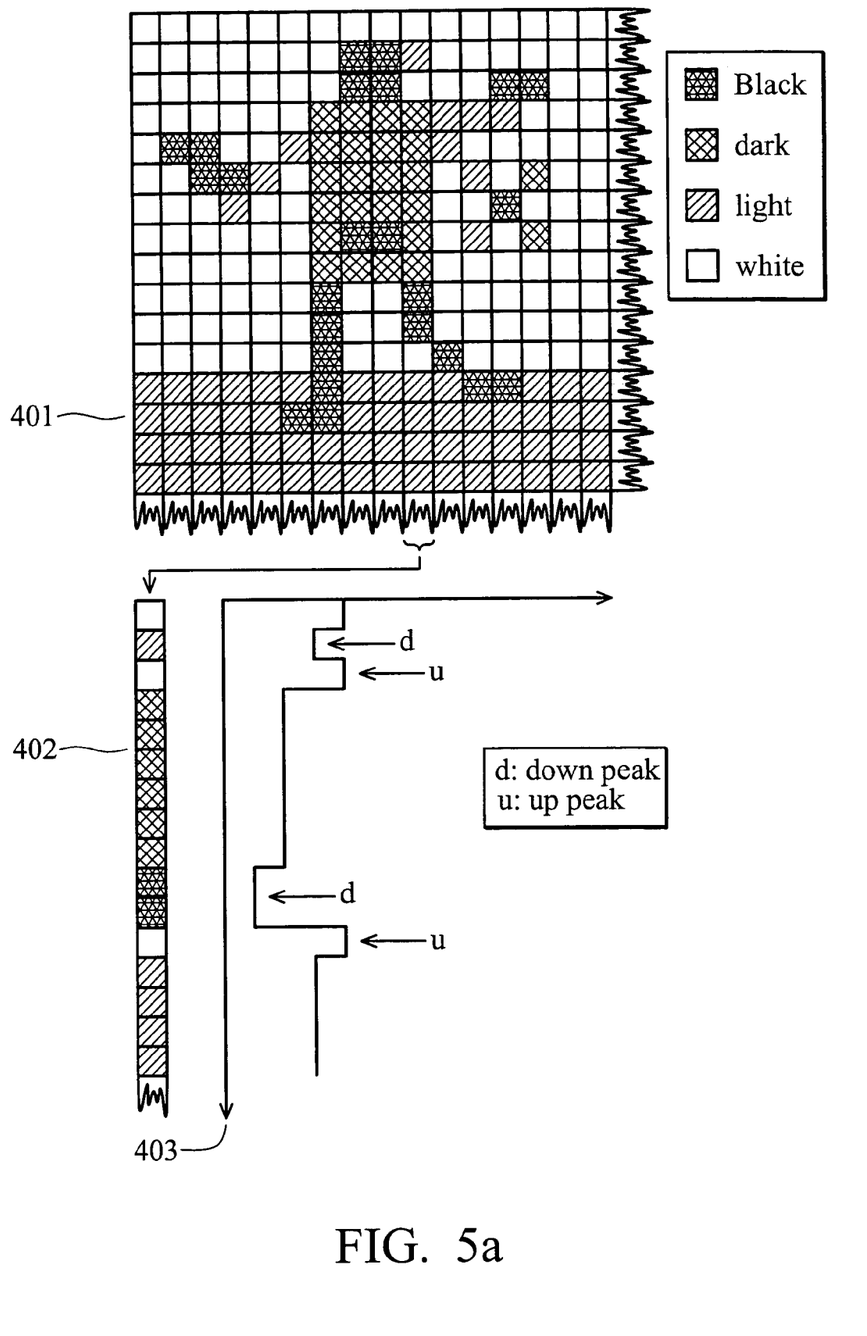
FIG. 5A shows the image qualification method scanning a vertical line 402.
Figure 5B:
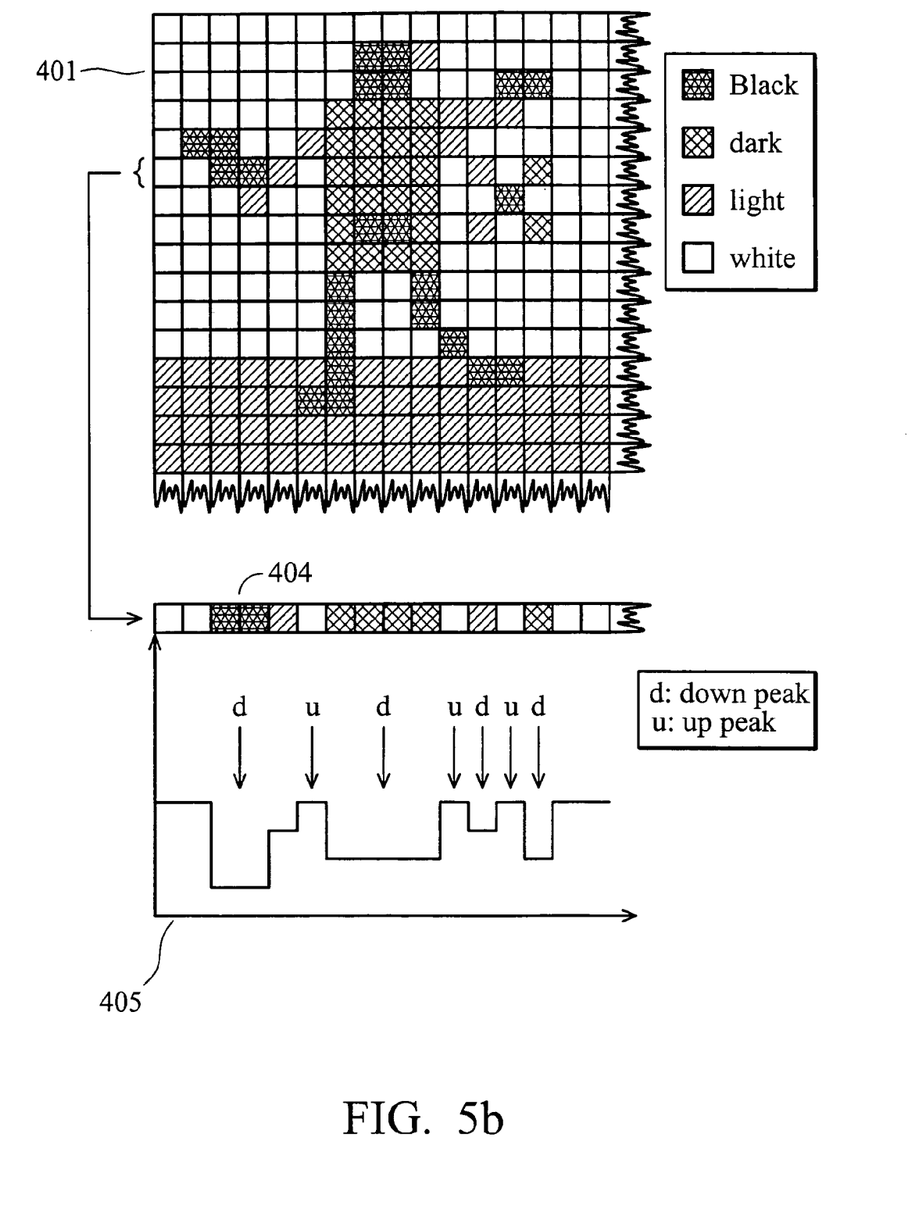
FIG. 5B shows the image qualification method scanning a horizontal line 404.

Vertically regarded, the image frame comprises a plurality of pixels formatted in vertical lines 402. Horizontally regarded, the image frame comprises a plurality of pixels formatted in horizontal lines 404. FIG. 5A shows an image frame evaluated for qualification by scanning of a vertical line 402. The brightness of pixels is shown in light and dark block units. In this embodiment a four-stage gray level shows a down peak and an up peak determined. A corresponding brightness table 403 is obtained, thereby the number of up peaks and down peaks can be counted trivially by observing the successive brightness differential changes. For example, among a series of successive pixels, the brightness keeps decreasing one after another, and when the brightness of a next pixel increases, it is said that a down peak is found. On the other hand, an up peak is found similarly when the brightness of a next pixel decreases among consecutive brightness increasing pixels. FIG. 5B shows an image frame evaluated for qualification by scanning of a horizontal line 404. Also, a corresponding brightness table 405 may be obtained, with the number of up peaks and down peaks.

In a preferred embodiment, an image frame 401 is assessed as qualified when the total number of up peaks and down peaks of the image frame exceeds a predetermined value. The up peaks and down peaks can be from either a vertical line 402 or a horizontal line 404. For example, an image frame 401 is assessed as qualified when up peaks and down peaks numbering more than 30.

In another preferred embodiment, a line is assessed as a qualifying line when the total number of up peaks and down peaks therein exceeds a predetermined value, and an image frame 401 is assessed as qualified when the number of qualified lines exceed a predetermined value. The lines can be either vertical lines 402 or horizontal lines 404. Thereby an image frame 401 is assessed as qualified when, for example, more than 10 lines therein are assessed as qualified. By means of the real-time image qualification method provided in the present invention, only one image frame is required to determine whether the frame is qualified or not, and further motion detections can proceed in real time.

The predetermined value specified to determine quality of the image frame, can be obtained dynamically according to an average value of the total of peaks occurred in the past consecutive image frames. For example, if the past five image frames have a total of 100 peaks, then the average value is 20, whereby the predetermined value may be accorded. When another five consecutive image frames have a total of 50 peaks, the average value becomes 10, and the predetermined value can be changed accordingly.

Figure 6:
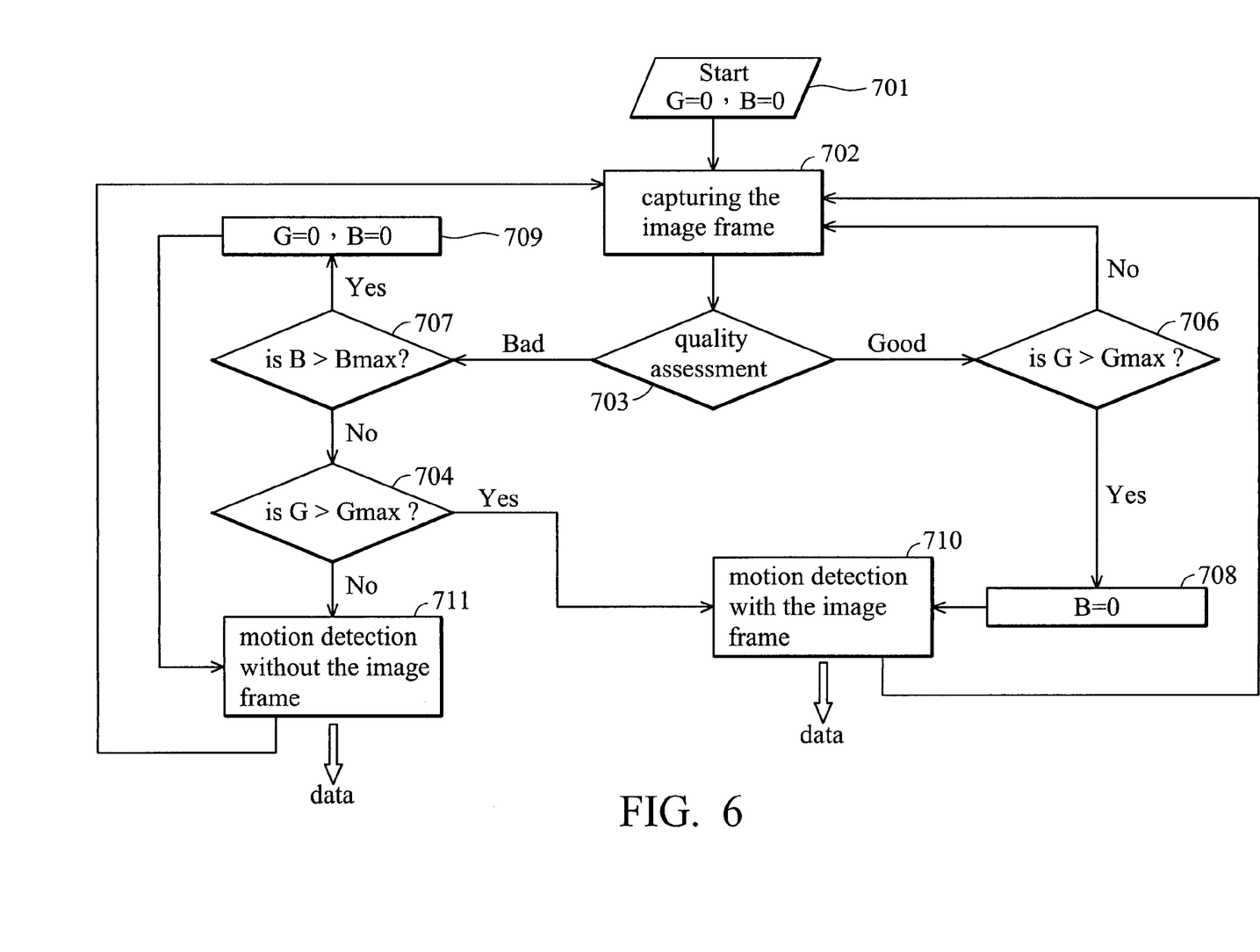
FIG. 6 is a flowchart of the motion detection method for the optical navigation sensor according to an embodiment of the invention.

FIG. 6 is a flowchart of a motion detection method for the optical navigation sensor. The heuristic is to use two counters simultaneously. Considerations for a first counter G, a second counter B and the quality of the image frame are sufficient for motion detection. In an embodiment, an optical navigation sensor 601 having motion detection capability, estimates motion by the following steps. A first counter G and a second counter B are provided initially (701), and an image frame is then captured by the image capture device 602 (702) and sent to the quality control device 603 for quality assessment (703). When the image frame is assessed as qualified, it is registered with the first counter G and the total therein is checked against a qualified threshold $G_{max}$ (706). If the image frame is assessed as unqualified, it is registered with the second counter B and the total therein is checked against an unqualified threshold $B_{max}$ (707). When the total in the first counter G does not exceed the qualified threshold $G_{max}$ (706), no sensor activity is performed and the process returns to image capturing (702). When the total in the second counter B exceeds the unqualified threshold $B_{max}$ (707), both counters are reset (709) and another motion detection (711) proceeds. When the second counter B does not exceed an unqualified threshold $B_{max}$, the first counter G is checked against the qualified threshold $G_{max}$ (704). If the result is negative (704), motion detection without the image frame (711) proceeds.

When the image frame is assessed as qualified (703), and the first counter G exceeds the qualified threshold $G_{max}$ (706), the second counter B is then reset (708) and motion detection with the image frame (710) proceeds. Motion detection with the image frame (710) is also taken place when the image frame is assessed as unqualified (703), and the second counter B does not exceed the unqualified threshold $B_{max}$ (707), plus the first counter G exceeding the qualified threshold $G_{max}$ (704).

After outputting results from step 710 or 711, the process returns to the capturing step (702).

Thus in this embodiment, result is output from the quality control device 603 when the first counter G exceeds the qualified threshold $G_{max}$. When the first counter G meets the requirement, motion detection continues with the image frame. The image frame is output for motion detection (710) when the image frame is assessed as qualified in 703. On the other hand, motion detection takes place in a prediction process without an image frame (711) when the image frame is assessed as unqualified in 703. Thus the qualified threshold 706 and the unqualified threshold 707 determine the sensitivity to prevent flicker from erroneous image frames. The qualified threshold 706 represents quality requisites for detecting motion, and the unqualified threshold 707 represents sensitivity to determine when to deactivate motion detection.

In another preferred embodiment, a dynamic tuning mechanism can be provided by the threshold control device 606 of the optical navigation sensor 601. For example, a ratio of qualified to unqualified image frames can be provided to determine under what circumstances the optical navigation sensor 601 is. If quality is always good, the total of the unqualified threshold 707 can be tuned higher to increase the sensitivity to erroneous conditions, so as to decrease fault in motion detections. On the other hand, in unstable conditions, the occurrence of unqualified image frames is high, so the total of the unqualified threshold 707 can be tuned lower to increase reset opportunities (in 709). An image frame is sent to the motion detector 604 for motion detection, normally, and when motion detection takes place without the image frame, through a prediction process, sufficient data, such as previously obtained data or previously calculated motion, is required to initiate the prediction. The motion detector 604 requires a number of image frames to estimate motion in a prediction process such that the total of the qualified threshold is determined accordingly, through the threshold control device 606.

Since motion detection takes place in a prediction process without an image frame (711) when the image frame is assessed as unqualified in 703, motion is detected according to previously obtained data or previously calculated motion, through an interpolation or extrapolation algorithm, or any statistical modeling method.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A motion detection method for an optical navigation sensor, comprising steps of:
   capturing an image frame associated with the optical navigation sensor;
   distinguishing a qualified image frame from an unqualified image frame according to a quality prerequisite;
   providing a first counter to record incidence of qualified image frames, and a second counter to record incidence of unqualified image frames;
   when a first condition is met, proceeding motion detection and returning to the capturing step; and
   when a second condition is met, skipping the image frame and returning to the capturing step.

2. The method as claimed in claim 1, wherein:
   the first condition is met when the image frame is qualified and the total of the first counter exceeds a predetermined qualified threshold; and
   when the first condition is met, the second counter is reset and the image frame is output with the image frame.

3. The method as claimed in claim 1, wherein:
   the first condition is met when the image frame is unqualified, the second counter does not exceed a predetermined unqualified threshold and the total of the first counter exceeds a predetermined qualified threshold; and when the first condition is met, the image frame is output with the image frame.

4. The method as claimed in claim 1, wherein:

the first condition is met when the image frame is unqualified, the second counter does not exceed a predetermined unqualified threshold and the first counter does not exceed a predetermined qualified threshold; and when the first condition is met, motion is detected without the image frame.

5. The method as claimed in claim 1, wherein:

the second condition is met when the image frame is qualified and the first counter does not exceed a predetermined qualified threshold; and when the second condition is met, return to the capturing step.

6. The method as claimed in claim 1, wherein:

the second condition is met when the image frame is unqualified, and the second counter exceeds a predetermined unqualified threshold; and when the second condition is met, the first counter and the second counter are reset, and motion is detected without the image frame.

7. The method as claimed in claim 1, wherein:

the image frame is formatted in a number of lines, each comprising a plurality of pixels; and the distinguishing step further comprises:

evaluating a plurality of characteristics of the image frame to determine whether the image frame is qualified or unqualified; and outputting a result accordingly.

8. The method as claimed in claim 7, wherein the evaluating step comprises:

scanning a line comprising a plurality of pixels;

converting the brightness of pixels to a data curve;

deriving a differential curve from the data curve;

determining a point where the differential curve goes from positive to negative to be an up peak; and determining the point, where the differential curve goes from negative to positive to be a down peak.

9. The method as claimed in claim 8, wherein the evaluating step further comprises:

accounting the number of up peaks and down peaks within the image frame;

assessing the image frame as qualified when the number of up peaks and down peaks exceeds a predetermined value; and assessing the image frame as unqualified when the number of up peaks and down peaks does not exceed a predetermined value.

10. The method as claimed in claim 9, wherein the predetermined value is specified according to an average value of number of up peaks and down peaks within a plurality of lines last assessed.

11. The method as claimed in claim 8, wherein the evaluating step further comprises:

accounting the number of up peaks and down peaks within one line;

assessing the line as a qualified line when the number of up peaks and down peaks within the line exceeds a predetermined value;

assessing the image frame as qualified when the number of the qualified lines within the image frame exceeds a predetermined threshold; and assessing the image frame as unqualified when the number of the qualified lines within the image frame does not exceed a predetermined threshold.

12. The method as claimed in claim 11, wherein:

the predetermined value is specified according to an average value of number of up peaks and down peaks within a plurality of lines last assessed; and the predetermined threshold is specified according to an average value of number of qualified lines within a plurality of image frames last assessed.

13. A real-time image qualification method for an optical navigation sensor, comprising steps of:

capturing an image frame associated with the optical navigation sensor;

evaluating a plurality of characteristics of the image frame to determine whether the image frame is qualified or unqualified; and outputting a result accordingly for motion detection, wherein the image frame is formatted in a number of lines, each comprising a plurality of pixels and the evaluating step comprises:

scanning a line comprising a plurality of pixels;

converting the brightness of pixels to a data curve;

deriving a differential curve from the data curve;

determining a point where the differential curve goes from positive to negative to be an up peak; and determining the point where the differential curve goes from negative to positive to be a down peak.

14. The method as claimed in claim 13, wherein the evaluating step further comprises:

accounting the number of up peaks and down peaks within the image frame;

assessing the image frame as qualified when the number of up peaks and down peaks exceeds a predetermined value; and assessing the image frame as unqualified when the number of up peaks and down peaks does not exceed a predetermined value.

15. The method as claimed in claim 14, wherein:

the predetermined value is specified according to an average value of number of up peaks and down peaks within a plurality of image frames last assessed.

16. The method as claimed in claim 13, wherein the evaluating step further comprises:

accounting the number of up peaks and down peaks within one of the lines;

assessing the line as qualified when the number of up peaks and down peaks within the line exceeds a predetermined value;

assessing the image frame as qualified when the number of the qualified lines within the image frame exceeds a predetermined threshold; and assessing the image frame as unqualified when the number of the qualified lines within the image frame does not exceed a predetermined threshold.

17. The method as claimed in claim 16, wherein:

the predetermined value is specified according to an average value of number of up peaks and down peaks within a plurality of lines last assessed; and the predetermined threshold is specified according to an average value of number of qualified lines within a plurality of image frames last assessed.

18. An optical navigation sensor comprising:

an image capture device, for capturing an image frame;

a quality control device, for assessing the quality of the image frame and outputting a result indicating whether the image frame is qualified or unqualified for motion detection; and a motion detector, for detecting motion of the optical navigation sensor according to the result output, wherein:

the quality control device receives the image frame from the image capture device;

the quality control device distinguishes a qualified image frame from an unqualified image frame according to a quality prerequisite;

the quality control device provides a first counter to record incidence of the qualified image frames, and a second counter to record incidence of the unqualified image frames; and the quality control device outputs a result to the motion detector according to the image frame, the first counter and the second counter.

19. The optical navigation sensor as claimed in claim 18, wherein the quality control device outputs a qualified result to the motion detector when the image frame is qualified, and the first counter exceeds a predetermined qualified threshold.

20. The optical navigation sensor as claimed in claim 19, wherein the quality control device outputs a qualified result to the motion detector when the image frame is unqualified, the second counter does not exceed a predetermined unqualified threshold, and the first counter exceeds a predetermined qualified threshold.

21. The optical navigation sensor as claimed in claim 20, wherein the quality control device outputs an unqualified result to the motion detector when the image frame is unqualified, the second counter does not exceed a predetermined unqualified threshold, and the first counter does not exceed a predetermined qualified threshold.

22. The optical navigation sensor as claimed in claim 21, wherein:

when the qualified result is output, the motion detector detects motion according to the image frame; and when the unqualified result is output, the motion detector detects motion without the image frame.

* * * * *